US012587907B2

(12) United States Patent
Cao et al.

(10) Patent No.: US 12,587,907 B2
(45) Date of Patent: Mar. 24, 2026

(54) HANDOVER METHOD AND APPARATUS, AND INFORMATION TRANSMITTING METHOD AND APPARATUS

(71) Applicant: ZTE Corporation, Shenzhen (CN)

(72) Inventors: Kun Cao, Shenzhen (CN); Lin Chen, Shenzhen (CN); Tao Qi, Shenzhen (CN); Liping Wang, Shenzhen (CN); Hao Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 411 days.

(21) Appl. No.: 17/926,231

(22) PCT Filed: May 18, 2021

(86) PCT No.: PCT/CN2021/094322
§ 371 (c)(1),
(2) Date: Nov. 18, 2022

(87) PCT Pub. No.: WO2021/233279
PCT Pub. Date: Nov. 25, 2021

(65) Prior Publication Data
US 2023/0199569 A1 Jun. 22, 2023

(30) Foreign Application Priority Data
May 18, 2020 (CN) .......................... 202010421335.6

(51) Int. Cl.
*H04W 36/00* (2009.01)
(52) U.S. Cl.
CPC ... *H04W 36/0007* (2018.08); *H04W 36/0061* (2013.01)

(58) Field of Classification Search
CPC ......... H04W 36/0007; H04W 36/0061; H04W 4/06; H04W 36/08; H04W 36/16; H04W 36/0011
See application file for complete search history.

(56) References Cited

U.S. PATENT DOCUMENTS

| | | | |
|---|---|---|---|
| 2006/0146858 A1* | 7/2006 | Kim ...................... | H04W 72/30 370/465 |
| 2009/0019173 A1 | 1/2009 | Wu et al. | |

(Continued)

FOREIGN PATENT DOCUMENTS

| | | |
|---|---|---|
| CN | 102291688 A | 12/2011 |
| CN | 103828266 A | 5/2014 |

(Continued)

OTHER PUBLICATIONS

International Search Report for corresponding application PCT/CN2021/094322 filed May 18, 2021; Report dated Aug. 10, 2021.

(Continued)

*Primary Examiner* — Kan Yuen
(74) *Attorney, Agent, or Firm* — CANTOR COLBURN LLP

(57) ABSTRACT

Provided are a handover method and apparatus, and an information transmitting method and apparatus. The handover method includes: transmitting a handover request to a second network device, the handover request carrying Multicast Broadcast Service (MBS) session/bearer information; and receiving a handover request response transmitted by the second network device, the handover request response including at least one of the following: MBS session/bearer information that can be accepted by the second network device, MBS session/bearer information that cannot be accepted by the second network device, UE (User Equipment) scheduling configuration information of the second (Continued)

A first network device transmits a handover request to a second network device, herein the handover request carries MBS session/bearer information

S102

The first network device receives a handover request response transmitted by the second network device, herein the handover request response includes at least one of the following: MBS session/bearer information that can be accepted by the second network device, MBS session/bearer information that cannot be accepted by the second network device, UE scheduling configuration information of the second network device, or bearer configuration information of the second network device

S104 network device, or bearer configuration information of the second network device.

14 Claims, 6 Drawing Sheets

(56)                    References Cited

U.S. PATENT DOCUMENTS

| | | |
|---|---|---|
| 2013/0003577 A1 | 1/2013 | Gupta |
| 2013/0083715 A1 | 4/2013 | Etemad et al. |
| 2014/0029580 A1* | 1/2014 | Jung .................. H04W 36/0066 |
| | | 370/331 |
| 2014/0112236 A1 | 4/2014 | Jung et al. |
| 2015/0195684 A1* | 7/2015 | Lohmar ................ H04W 76/11 |
| | | 370/312 |
| 2015/0365963 A1* | 12/2015 | Won ...................... H04W 4/029 |
| | | 370/329 |
| 2016/0080163 A1* | 3/2016 | Taylor ................... H04W 4/024 |
| | | 370/312 |
| 2016/0381517 A1* | 12/2016 | Kim ...................... H04W 76/10 |
| | | 370/331 |
| 2018/0139665 A1* | 5/2018 | Park ................... H04W 36/0061 |
| 2018/0160342 A1 | 6/2018 | Park et al. |
| 2020/0092757 A1* | 3/2020 | Xu ..................... H04W 36/0007 |
| 2020/0145967 A1* | 5/2020 | Park ...................... H04W 72/23 |
| 2021/0037347 A1 | 2/2021 | Kim et al. |
| 2022/0322291 A1* | 10/2022 | Wang ..................... H04W 4/06 |
| 2022/0408162 A1* | 12/2022 | Jia ...................... H04N 21/6408 |

FOREIGN PATENT DOCUMENTS

| | | |
|---|---|---|
| CN | 104871570 A | 8/2015 |
| CN | 106341848 A | 1/2017 |
| CN | 107005820 A | 8/2017 |
| CN | 111866975 A | 10/2020 |
| WO | 2015109475 A1 | 7/2015 |
| WO | 2017065501 A1 | 4/2017 |
| WO | 2018012810 A1 | 1/2018 |

OTHER PUBLICATIONS

Written Opinion for corresponding application PCT/CN2021/094322 filed May 18, 2021; Report dated Aug. 10, 2021.
Chinese Search Report for Application No. 2020104213356, 3 pages.
European Search Report for Application No. 21809000.9, dated Jan. 30, 2024, 17 pages.

* cited by examiner ing gNB 101 gNB 102

Terminal 110

Terminal 120

Terminal 130

Input/output device 208

Transmission device 206

Processor 202

Memory 204

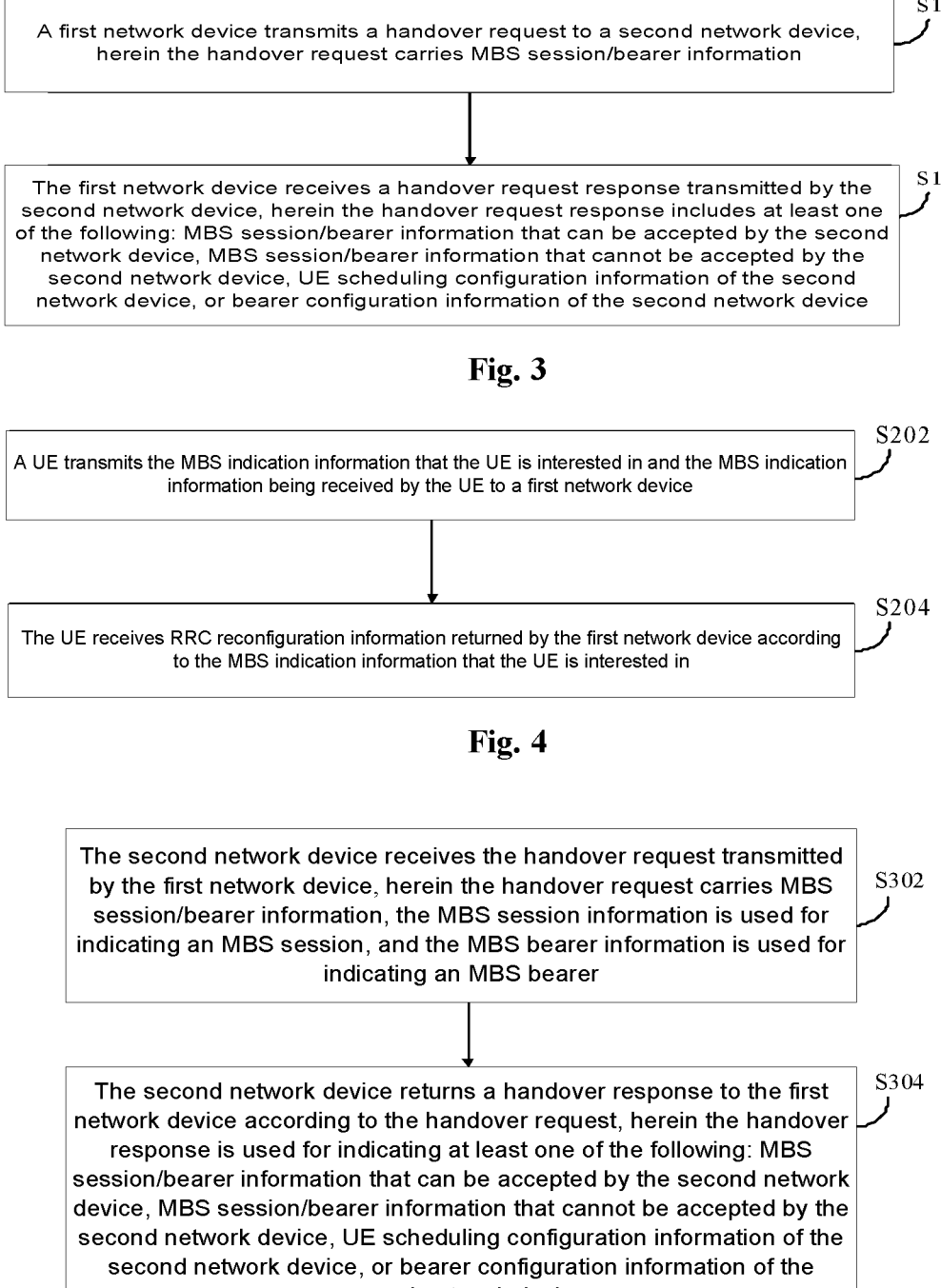

S102

A first network device transmits a handover request to a second network device, herein the handover request carries MBS session/bearer information

S104

The first network device receives a handover request response transmitted by the second network device, herein the handover request response includes at least one of the following: MBS session/bearer information that can be accepted by the second network device, MBS session/bearer information that cannot be accepted by the second network device, UE scheduling configuration information of the second network device, or bearer configuration information of the second network device

A UE transmits the MBS indication information that the UE is interested in and the MBS indication information being received by the UE to a first network device

S204

The UE receives RRC reconfiguration information returned by the first network device according to the MBS indication information that the UE is interested in

The second network device receives the handover request transmitted by the first network device, herein the handover request carries MBS session/bearer information, the MBS session information is used for indicating an MBS session, and the MBS bearer information is used for indicating an MBS bearer

S304

The second network device returns a handover response to the first network device according to the handover request, herein the handover response is used for indicating at least one of the following: MBS session/bearer information that can be accepted by the second network device, MBS session/bearer information that cannot be accepted by the second network device, UE scheduling configuration information of the second network device, or bearer configuration information of the second network device

Fig. 5

1, User service information

2, SIB message

3, MBS interest indication information

4, Measurement report message

5, Handover request message

6, Handover request response message

7, RRC reconfiguration message

8, RRC reconfiguration completion message

First transmitting module — 402

First receiving module — 404

HANDOVER METHOD AND APPARATUS, AND INFORMATION TRANSMITTING METHOD AND APPARATUS

CROSS-REFERENCE TO RELATED APPLICATION

The present disclosure claims priority to Chinese Patent Application No. CN202010421335.6, filed on May 18, 2020, and entitled "handover method and apparatus, and information transmitting method and apparatus", the disclosure of which is hereby incorporated by reference in its entirety.

TECHNICAL FIELD

The disclosure relates to the field of communication, for example, to a handover method and apparatus, and an information transmitting method and apparatus.

BACKGROUND

With the increase of the demand for video services due to the increasing number of mobile terminal users, and the rapid development of a digital television technology and a network communication technology, a radio broadcasting service has become a hot spot concerned in the field of radio applications. A multimedia Multicast Broadcast Service (MBS) technology, as an important implementation method of mobile TV, will play an important role in a 5G system and have a great development prospect.

An evolved Multicast Broadcast Multimedia Service (eMBMS for short) is a key technology for providing real-time/non-real-time multimedia services for a user in a mode of multicast/broadcast at a radio layer. The eMBMS can realize broadcast transmission of a high-speed multimedia service, that is, Point to Multipoint (PTM, that is, broadcast/multicast), and provide rich video, audio, and multimedia services. Therefore, the eMBMS is further developed in the 5G system, which can improve the capability of the overall broadcast system, so that 5G broadcasting application scenarios which have higher speed and are more efficient can be supported, for example, high-quality multimedia services such as a 41K/8K ultra-high-definition video, a three-dimensional stereo video, and Virtual Reality (VR)/Augmented Reality (AR).

In a related art, there is no clear scheme on how to reasonably and effectively realize a broadcast/multicast service under a 5G New Radio (5G-NR) technology, especially for the mobility of a connected User Equipment (UE) and the continuity of the broadcast/multicast service during the handover of a network device that provides services.

An effective solution has not been proposed yet in the related art for the problem about how to realize a handover process across gNBs in the abovementioned related art.

SUMMARY

Embodiments of the disclosure provide a handover method and apparatus, and an information transmitting method and apparatus, so as to at least solve the problem about how to realize a handover process across base stations in a related art.

According to one embodiment of the disclosure, a handover method is provided, which may be applied to a first network device, and may include the following operations: a handover request may be transmitted to a second network device. The handover request may carry Multicast Broadcast Service (MBS) session/bearer information; a handover request response transmitted by the second network device may be received; the handover request response may include at least one of the following: MBS session/bearer information that can be accepted by the second network device, MBS session/bearer information that cannot be accepted by the second network device, UE (User Equipment) scheduling configuration information of the second network device, or bearer configuration information of the second network device.

According to another embodiment of the disclosure, an information transmitting method is further provided, which may be applied to UE, and may include the following operations: the MBS indication information that the UE is interested in and the MBS indication information being received by the UE may be transmitted to a first network device. Radio Resource Control (RRC) reconfiguration information returned by the first network device according to the MBS indication information that the UE is interested in may be received.

According to another embodiment of the disclosure, a handover method is further provided, which may be applied to a second network device, and may include the following operations: a handover request transmitted by a first network device may be received. The handover request may carry MBS session/bearer information, the MBS session information may be used for indicating an MBS session, and the MBS bearer information may be used for indicating an MBS bearer; a handover response may be returned to the first network device according to the handover request. The handover response may be used for indicating at least one of the following: MBS session/bearer information that can be accepted by the second network device, MBS session/bearer information that cannot be accepted by the second network device, UE scheduling configuration information of the second network device, or bearer configuration information of the second network device.

According to another embodiment of the disclosure, a handover apparatus is further provided, which may be configured at a first network device, and may include: a first transmitting module, and a first receiving module. The first transmitting module may be configured to transmit a handover request to a second network device. The handover request carries MBS session/bearer information. The first receiving module may be configured to receive a handover request response transmitted by the second network device. The handover request response may include at least one of the following: MBS session/bearer information that can be accepted by the second network device, MBS session/bearer information that cannot be accepted by the second network device, UE scheduling configuration information of the second network device, or bearer configuration information of the second network device.

According to another embodiment of the disclosure, an information transmitting apparatus is further provided, which may be configured at a UE, and may include: a second transmitting module, and a second receiving module. The second transmitting module may be configured to transmit MBS indication information that the UE is interested in and the MBS indication information being received by the UE to a first network device. The second receiving module may be configured to receive RRC reconfiguration information returned by the first network device according to the MBS indication information that the UE is interested in.

According to another embodiment of the disclosure, a handover apparatus is further provided, which may be configured at a second network device, and may include: a third receiving module and a returning module. The third returning module may be configured to receive a handover request transmitted by a first network device. The handover request may carry MBS session/bearer information, the MBS session information may be used for indicating an MBS session, and the MBS bearer information may be used for indicating an MBS bearer. The returning module may be configured to return a handover response to the first network device according to the handover request. The handover response may be used for indicating at least one of the following: MBS session/bearer information that can be accepted by the second network device, MBS session/bearer information that cannot be accepted by the second network device, UE scheduling configuration information of the second network device, or bearer configuration information of the second network device.

According to another embodiment of the disclosure, a computer-readable storage medium is further provided. The computer-readable storage medium stores a computer program. The computer program is configured to perform the steps in any one of the abovementioned method embodiments when being run.

According to another embodiment of the disclosure, an electronic apparatus is further provided, which may include a memory and a processor. The memory stores a computer program, and the processor is configured to run the computer program to perform the steps in any one of the abovementioned method embodiments.

According to the handover method and apparatus, and the information transmitting method and apparatus, the first network device may be enabled to transmit the handover request to the second network device. The handover request carries the MBS session/bearer information, the MBS session information is used for indicating the MBS session, and the MBS bearer information is used for indicating the MBS bearer. The first network device may be enabled to receive the handover request response transmitted by the second network device. The handover request response includes at least one of the following: MBS session/bearer information that can be accepted by the second network device, MBS session/bearer information that cannot be accepted by the second network device, UE scheduling configuration information of the second network device, or bearer configuration information of the second network device. Therefore, by the handover method and apparatus, and the information transmitting method and apparatus in the embodiments of the disclosure, the problem about how to realize a handover process across base stations in a related art can be solved, so as to achieve an effective of effectively ensuring the continuity of broadcast/multicast services in the handover process across base stations.

BRIEF DESCRIPTION OF THE DRAWINGS

FIG. 3 illustrates a flowchart of a handover method provided by the embodiments of the disclosure.

FIG. 4 illustrates a flowchart of an information transmitting method provided by the embodiments of the disclosure.

FIG. 5 illustrates a flowchart of a handover method provided by the embodiments of the disclosure.

DETAILED DESCRIPTION OF THE EMBODIMENTS

Figure 1:
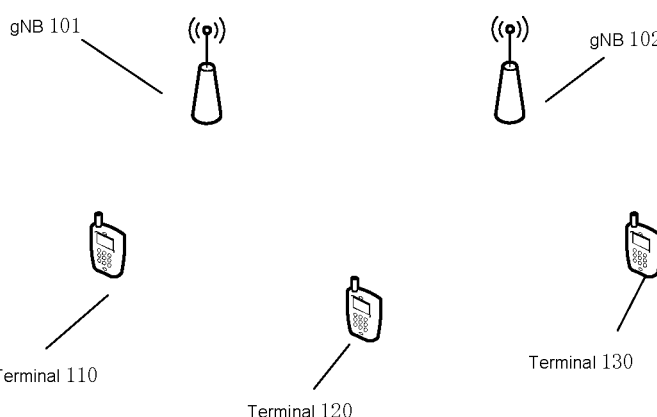
FIG. 1 illustrates a schematic diagram of architecture of a wireless network system provided by the embodiments of the disclosure.

The disclosure will be described in detail below with reference to the drawings and in combination with the embodiments. It is to be noted that embodiments in the disclosure and features in the embodiments may be combined without a conflict.

It is to be noted that the specification and claims of the disclosure and the terms "first", "second" and the like in the drawings are used to distinguish similar objects, and do not need to describe a specific sequence or a precedence order.

In order to further describe the working modes of the handover method and apparatus and the information transmitting method and apparatus in the embodiments of the disclosure, the application scenarios of the handover method and apparatus and the information transmitting method and apparatus in the embodiments of the disclosure are described below.

The embodiments of the disclosure may be applied to various communication systems, for example a Global System for Mobile Communications (GSM) system, a Code Division Multiple Access (CDMA) system, a Wideband Code Division Multiple Access (WCDMA) system, a General Packet Radio Service (GPRS) system, a Long Term Evolution (LTE) system, an Advanced long term evolution (LTE-A)system, a Universal Mobile Telecommunication System (UMTS) system, and a 5th generation (5G) wireless system. No limits are made thereto in the embodiments of the disclosure. In the embodiment of the disclosure, the 5G system is described as an example.

The embodiment of the disclosure may be used for wireless networks of different standards. A wireless access network may include different communication nodes in different systems. FIG. 1 illustrates a schematic diagram of architecture of a wireless network system provided by the embodiments of the disclosure. As shown in FIG. 1, the wireless network system under the network architecture includes a next Generation Node B (gNB) 101, a gNB 102, a terminal 110, a terminal 120, and a terminal 130. The gNB 101 and the gNB 102 may be the gNBs of neighboring cells. The gNB 101 and the gNB 102 may perform wireless communication with the terminal 110, the terminal 120, and the terminal 130 respectively, and the terminal 110, the terminal 120, and the terminal 130 may handover between the gNB 101 and the gNB 102.

In the embodiments of the disclosure, the network device may be a device that can communicate with a user terminal. The network device may be any device with a wireless transceiving function, which includes, but is not limited to: a NodeB, an evolved NodeB (eNodeB), a NodeB in a 5G communication system, a NodeB in a future communication system, an access node in a Wireless Fidelity (WiFi) system, a wireless relay node, a wireless backhaul node, etc. The network device may also be a wireless controller in a Cloud Radio Access Network (CRAN) scenario. The network device may also be a small station, a Transmission Reference Point (TRP), etc. No limits are made thereto in the embodiments of the disclosure.

In the embodiments of the disclosure, the terminal is a device with a wireless transceiving function, may be deployed on land, including indoor or outdoor, hand-held, wearable, or in-vehicle deployment, may also be deployed on water (for example, on a ship), or may also be deployed in the air (for example, on an airplane, a balloon, or a satellite). The user terminal may be a mobile phone, a pad, a computer with a wireless transceiving function, a Virtual Reality (VR) terminal, an Augmented Reality (AR) terminal, a wireless terminal in industrial control, a wireless terminal in self driving, a wireless terminal in remote medical, a wireless terminal in smart grid (smart grid), a wireless terminal in transportation safety, a wireless terminal in smart city, a wireless terminal in smart home, etc. No limits are made to the abovementioned specific application scenarios or application objects in the embodiments of the disclosure. The terminal may sometimes be called a terminal, an access terminal, a UE unit, UE station, a mobile station, a mobile platform, a remote station, a remote terminal, a mobile device, a UE terminal, a wireless communication device, a UE proxy, a UE apparatus, or the like. No limits are made thereto in the embodiments of the disclosure.

Figure 2:
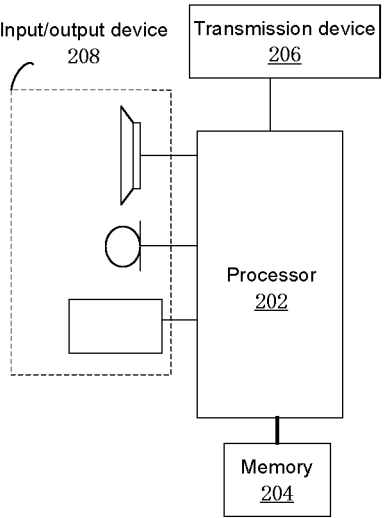
FIG. 2 illustrates a block structural diagram of hardware of a mobile terminal provided by the embodiments of the disclosure.

Description is made by taking the abovementioned terminal being a mobile terminal as an example. FIG. 2 illustrates a block structural diagram of hardware of a mobile terminal provided by the embodiments of the disclosure. As shown in FIG. 2, the mobile terminal may include one or more (only one shown in FIG. 2) processors 202 (the processors 202 may include, but are not limited to, processing apparatuses such as a Microprocessor Control Unit (MCU) or Field Programmable Gate Array (FPGA)) and a memory 204 for storing data. In an embodiment, the abovementioned mobile terminal may also include a transmission device 206 for a communication function and an input/output device 208. Those of ordinary skill in the art may understand that the structure shown in FIG. 2 is only illustrative and does not limit the structure of the abovementioned mobile terminal. For example, the mobile terminal may also include more or fewer components than those shown in FIG. 2, or has a different configuration from that shown in FIG. 2.

The memory 204 may be configured to store a computer program, for example, a software program and module of disclosure software, such as a computer program corresponding to an information transmitting method in the embodiments of the disclosure. The processor 202 executes various functional disclosures and data processing, that is, implements the abovementioned method by running the computer program stored in the memory 204. The memory 204 may include a high speed random access memory and may also include a non-volatile memory such as one or more magnetic storage apparatuses, flash memories, or other non-volatile solid state memories. In some examples, the memory 204 may further include memories remotely located relative to the processor 202. These remote memories may be connected to the mobile terminal through a network. The examples of the abovementioned network include, but are not limited to, the Internet, the Intranet, a local area network, a mobile communication network, and combinations thereof.

The transmission device 206 is configured to receive or transmit data through a network. Specific examples of the abovementioned network may include a wireless network provided by a communication provider of the mobile terminal. In an example, the transmission device 206 includes a Network Interface Controller (NIC) that can be connected to other network devices through the gNB, so as to communicate with the Internet. In an example, the transmission device 206 may be a Radio Frequency (RF) module, which is configured to communicate with the Internet wirelessly.

The embodiments of the disclosure involve information interaction among three entities of a terminal, a first network device, and a second network device, and mainly involve signaling transmission of an Uu port and an Xn port. The first network device is a source network device, for example, a source gNB; the second network device is a target network device in a handover process, for example, a target gNB; and the second network device may specifically be a network device in a neighboring cell of the first network device. The terminal in the embodiments of the disclosure is a connected terminal. The abovementioned terminal, the first network device, and the second network device may respectively correspond to the terminal 110, the gNB 101, and the gNB 102 in the abovementioned network architecture as shown in FIG. 1.

The working modes of the handover method and apparatus, and the information transmitting method and apparatus in the embodiments of the disclosure are described as follows.

Embodiment 1

The embodiments of the disclosure provide a handover method, which is applied to a first network device. FIG. 3 illustrates a flowchart of a handover method provided by the embodiments of the disclosure. As shown in FIG. 3, the handover method in the present embodiment includes the following steps.

At S102, a first network device transmits a handover request to a second network device. The handover request carries MBS session/bearer information.

At S104, the first network device receives a handover request response transmitted by the second network device. The handover request response includes at least one of the following: MBS session/bearer information that can be accepted by the second network device, MBS session/bearer information that cannot be accepted by the second network device, UE scheduling configuration information of the second network device, or bearer configuration information of the second network device.

It is to be further noted that, in the abovementioned MBS session/bearer information, the MBS session information is used for indicating an MBS session, and the MBS bearer information is used for indicating an MBS bearer.

It is to be further noted that the UE scheduling configuration information of the second network device and the bearer configuration information of the second network device included in the abovementioned handover request response may be further transmitted to the UE in a transparent transmission mode for the first network device.

According to the handover method in the embodiments of the disclosure, the first network device may be enabled to transmit the handover request to the second network device. The handover request carries the MBS session/bearer information, the MBS session information is used for indicating the MBS session, and the MBS bearer information is used for indicating the MBS bearer. The first network device is enabled to receive the handover request response transmitted by the second network device. The handover request response includes at least one of the following: MBS session/bearer information that can be accepted by the second network device, MBS session/bearer information that cannot be accepted by the second network device, UE scheduling configuration information of the second network device, or bearer configuration information of the second network device. Therefore, by the handover method and apparatus, and the information transmitting method and apparatus in the embodiments of the disclosure, the problem about how to realize a handover process across gNBs in a related art can be solved, so as to achieve an effective of effectively ensuring the continuity of broadcast/multicast services in the handover process across base stations.

Specifically, by the handover method in the embodiments of the disclosure, a specific mode of performing a handover process across gNBs in a 5G NR scenario is established, and the mobility of a connected UE and the continuity of broadcast/multicast services can be guaranteed during the handover process.

It is to be further noted that, in the abovementioned embodiment, in an embodiment, the MBS session information is further used for indicating MBS services corresponding to MBS sessions. The MBS sessions and the MBS services are in one-to-one correspondence, so the MBS session indicated by the MBS session information may correspond to the corresponding MBS service.

In an embodiment, the MBS session/bearer information includes at least one of the following: the MBS session information that a terminal is interested in, the MBS session/bearer information currently received by the terminal, or terminal capability information.

In an embodiment, the MBS session information that the terminal is interested in includes at least one of the following: identity information of an MBS session that the terminal is interested in, an MBS area identity, receiving priority information, and MBS session receiving mode information that the terminal expects.

In an embodiment, the receiving priority information includes at least one of the following: priority of unicast reception, priority of broadcast/multicast reception, or the priority of receiving an MBS session.

In an embodiment, the MBS session/bearer information currently received by the terminal includes at least one of the following: identity information of the MBS session/bearer currently received by the terminal, receiving mode information of the MBS session/bearer currently received by the terminal, Radio Bearer (RB) configuration information of an MBS bearer currently received by the terminal, or Quality of Service (QoS) configuration information of the MBS session/bearer currently received by the terminal.

In an embodiment, the MBS session receiving mode information that the terminal expects includes at least one of the following: Point to Point (PTP) reception, PTM reception, or PTP and PTM simultaneous reception. The receiving mode information of the MBS session/bearer currently received by the terminal includes at least one of the following: PTP reception, PTM reception, or PTP and PTM simultaneous reception.

In an embodiment, the terminal capability information is used for indicating that: the terminal supports receiving a unicast service and the MBS session in the same time slot; or, the terminal does not support receiving the unicast service and the MBS session in the same time slot.

In an embodiment, the RB configuration information includes: PTP bearer configuration information, and/or, PTM bearer configuration information. The PTP bearer configuration information is used for configuring a PTP bearer, and the PTP bearer includes at least one of the following: a PTP RB identify, Service Data Adaptation Protocol (SDAP) configuration information, Packet Data Aggregation Protocol (PDCP) configuration information, or Radio Link Control (RLC) bearer configuration information. The PTM bearer configuration information is used for configuring a PTM bearer, and the PTM bearer configuration information includes at least one of the following: a PTM RB identify, a logical channel identify, SDAP configuration information, PDCP configuration information, or RLC bearer configuration information.

In an embodiment, the identity information of the MBS session that the terminal is interested in includes at least one of the following: an MBS session identity, a Temporary Mobile Group Identity (TMGI) of the MBS session, or a Protocol Data Unit (PDU) session identity indicating a broadcast/multicast session.

In an embodiment, the MBS session/bearer information that can be accepted indicated in the handover request response includes at least one of the following:

an MBS session/bearer identity that can be accepted by the second network device, a receiving mode of the broadcast/unicast service session, or Quality of Service (QoS) configuration information of the service session/bearer that can be accepted.

In an embodiment, the MBS session/bearer information that cannot be accepted indicated in the handover request response includes at least one of the following:

an MBS session/bearer identity that cannot be accepted by the second network device, or a reason that the second network device cannot accept the MBS session/bearer corresponding to the MBS session/bearer identity.

In an embodiment, the bearer configuration information of the second network device includes at least one of the following: a PTM RB identify, a logical channel identify, SDAP configuration information, PDCP configuration information, or RLC bearer configuration information.

In an embodiment, the UE scheduling configuration information of the second network device indicated in the handover request response includes at least one of the following: scheduling information of a multicast service channel, or physical layer parameters required for configuring the multicast service channel.

In an embodiment, the handover request response further includes at least one of the following: system information block configuration information of the second network device, multicast control channel configuration information, or multicast service channel configuration information.

In an embodiment, the operation that the handover request is transmitted to the second network device includes the following operations: the handover request is transmitted to an Access and Mobility Management Function (AMF), and the handover request is forwarded to the second network device through the AMF. The handover request received by the second network device carries the MBS session bearer information.

It is further to be noted that the abovementioned AMF may indicate the AMF or a gateway in a core network.

In an embodiment, before the handover request is transmitted to the second network device, the method further includes the following operations: a measurement result of a broadcast/multicast service frequency point transmitted by a terminal is received.

Through the description of the above implementations, those of ordinary skill in the art can clearly understand that the method according to the abovementioned embodiment may be implemented by means of software plus a necessary general hardware platform, and of course, may also be implemented through hardware. Based on such understanding, the disclosure may be embodied in the form of a software product. The computer software product is stored in a storage medium (such as a Read-Only Memory (ROM)/ Random Access Memory (RAM), a magnetic disk, and a compact disk), including a plurality of instructions for enabling a terminal device (which may be a mobile phone, a computer, a server, or a network device, etc.) to perform the methods described in various embodiments of the disclosure.

Embodiment 2

The embodiments of the disclosure provide an information transmitting method, which is applied to a UE. FIG. 4 illustrates a flowchart of an information transmitting method provided by the embodiments of the disclosure. As shown in FIG. 4, the information transmitting method in the present embodiment includes the following steps.

At S202, a UE transmits the MBS indication information that the UE is interested in and the MBS indication information being received by the UE to a first network device.

At S204, the UE receives RRC reconfiguration information returned by the first network device according to the MBS indication information that the UE is interested in.

In an embodiment, the MBS indication information that the UE is interested in further includes: service identity information of an MBS that the UE is interested in. The service identity information of the MBS further includes at least one of the following: an MBS service/session identity, a TMGI of the MBS, an MBS identity, or a (PDU) session identity indicating an MBS session.

In an embodiment, the MBS indication information that the UE is interested in further includes: a receiving mode of the MBS that the UE is interested in. The receiving mode includes at least one of the following: unicast reception, multicast/broadcast reception, or unicast and multicast simultaneous reception.

In an embodiment, the MBS indication information that the UE is interested in further includes: a service area to which the MBS that the UE is interested in belongs.

In an embodiment, the RRC reconfiguration information includes: a target cell identity, an acceptable MBS list, acceptable MBS configuration information, and acceptable MBS receiving mode information.

In an embodiment, the acceptable MBS configuration information includes at least one of the following: a PTM RB identify, a logical channel identify, SDAP configuration information, PDCP configuration information, or RLC bearer configuration information.

In an embodiment, the acceptable MBS configuration information includes at least one of the following: scheduling information of a multicast service channel, or physical layer parameters required for configuring the multicast service channel.

In an embodiment, the acceptable MBS receiving mode information includes at least one of the following: unicast reception, multicast/broadcast reception, or unicast and multicast simultaneous reception.

In an embodiment, after receiving the RRC reconfiguration information returned by the first network device according to the MBS indication information, the method further includes the following operation: a resource of the first network device is released, the PDCP and the RLC are reconstructed according to the RB configuration information from the second network device, and a Media Access Control (MAC) is reset, so as to establish a PTM bearer, and receive a service based on the PTM bearer.

Through the description of the above implementations, those of ordinary skill in the art can clearly understand that the method according to the abovementioned embodiment may be implemented by means of software plus a necessary general hardware platform, and of course, may also be implemented through hardware. Based on such understanding, the disclosure may be embodied in the form of a software product. The computer software product is stored in a storage medium (such as a ROM/RAM, a magnetic disk, and a compact disk), including a plurality of instructions for enabling a terminal device (which may be a mobile phone, a computer, a server, or a network device, etc.) to perform the methods described in various embodiments of the disclosure.

Embodiment 3

The embodiments of the disclosure provide a handover method, which is applied to a second network device. FIG. 5 illustrates a flowchart of a handover method provided by the embodiments of the disclosure. As shown in FIG. 5, the handover method in the present embodiment includes the following steps.

At S302, the second network device receives the handover request transmitted by the first network device. The handover request carries MBS session/bearer information. The MBS session information is used for indicating an MBS session, and the MBS bearer information is used for indicating an MBS bearer.

S304, the second network device returns a handover response to the first network device according to the handover request. The handover response is used for indicating at least one of the following: MBS session/bearer information that can be accepted by the second network device, MBS session/bearer information that cannot be accepted by the second network device, terminal UE scheduling configuration information of the second network device, or bearer configuration information of the second network device.

It is to be further noted that the rest optional embodiments and technical effects of the handover method in the present embodiment all correspond to the handover method in Embodiment 1, and will not be elaborated herein.

In an embodiment, the MBS session/bearer information includes at least one of the following: the MBS session information that a terminal is interested in, the MBS session/ bearer information currently received by the terminal, or terminal capability information.

In an embodiment, the MBS session information that the terminal is interested in includes at least one of the following: identity information of an MBS session that the terminal is interested in, an MBS area identity, receiving priority information, MBS session receiving mode information that the terminal expects.

In an embodiment, the receiving priority information includes at least one of the following: priority of unicast reception, priority of broadcast/multicast reception, or the priority of receiving an MBS session.

In an embodiment, the MBS session/bearer information currently received by the terminal includes at least one of the following: identity information of the MBS session/bearer currently received by the terminal, receiving mode information of the MBS session/bearer currently received by the terminal, RB configuration information of an MBS bearer currently received by the terminal, or QoS configuration information of the MBS session/bearer currently received by the terminal.

In an embodiment, the MBS session receiving mode information that the terminal expects includes at least one of the following: PTP reception, PTM reception, or PTP and PTM simultaneous reception: the receiving mode information of the MBS session/bearer currently received by the terminal includes at least one of the following: PTP reception, PTM reception, or PTP and PTM simultaneous reception.

In an embodiment, the terminal capability information is used for indicating that: the terminal supports receiving a unicast service and the MBS session in the same time slot; or, the terminal does not support receiving the unicast service and the MBS session in the same time slot.

In an embodiment, the RB configuration information includes: PTP bearer configuration information, and/or, PTM bearer configuration information.

The PTP bearer configuration information is used for configuring a PTP bearer, and the PTP bearer includes at least one of the following:

a PTP RB identify, SDAP configuration information, PDCP configuration information, or RLC bearer configuration information.

The PTM bearer configuration information is used for configuring a PTM bearer, and the PTM bearer configuration information includes at least one of the following: a PTM RB identify, a logical channel identify, SDAP configuration information, PDCP configuration information, or RLC bearer configuration information.

In an embodiment, the identity information of the MBS session that the terminal is interested in includes at least one of the following: an MBS session identity, a TMGI of the MBS session, or a PDU session identity indicating a broadcast/multicast session.

In an embodiment, the MBS session/bearer information that can be accepted indicated in the handover request response includes at least one of the following: an MBS session/bearer identity that can be accepted by the second network device, a receiving mode of the broadcast/unicast service session, and Quality of Service (QoS) configuration information of the service session/bearer that can be accepted.

In an embodiment, the MBS session/bearer information that cannot be accepted indicated in the handover request response includes at least one of the following: an MBS session/bearer identity that cannot be accepted by the second network device, or a reason that the second network device cannot accept the MBS session/bearer corresponding to the MBS session/bearer identity.

In an embodiment, the bearer configuration information of the second network device includes at least one of the following: a PTM RB identify, a logical channel identify, SDAP configuration information, PDCP configuration information, or RLC bearer configuration information.

In an embodiment, the UE scheduling configuration information of the second network device indicated in the handover request response includes at least one of the following: scheduling information of a multicast service channel, or physical layer parameters required for configuring the multicast service channel.

In an embodiment, the handover request response further includes at least one of the following: system information block configuration information of the second network device, multicast control channel configuration information, or multicast service channel configuration information.

In an embodiment, the operation that the handover request is transmitted to the second network device includes the following operation: the handover request is transmitted to the AMF, and the handover request is forwarded to the second network device through the AMF. The handover request received by the second network device carries MBS session bearer information.

In an embodiment, the MBS session information is further used for indicating MBS services corresponding to MBS sessions. The MBS sessions and MBS services are in one-to-one correspondence.

In order to further describe the handover method and information transmitting method recorded in the abovementioned Embodiment 1 to Embodiment 3, an interaction process among the terminal, the first network device, and the second network device indicated by the abovementioned handover method and information transmitting method is further explained below through exemplary embodiments.

Exemplary Embodiment 1

The present exemplary embodiment explains an MBS session establishment process in the embodiments of the disclosure. Specifically, an MBS session may be established among a terminal, a source gNB, and a neighboring gNB through one of the following modes: an Xn Setup process, a gNB Configuration Update process, and operation administration and maintenance (OAM). It is to be further noted that the source gNB in the present exemplary embodiment is equivalent to a source network device in the embodiments of the disclosure, and the neighboring gNB in the embodiments of the disclosure is equivalent to a target network device in the embodiments of the disclosure. The abovementioned three establishment modes are described below through three examples.

Example 1: Xn Setup Process

Figure 6:
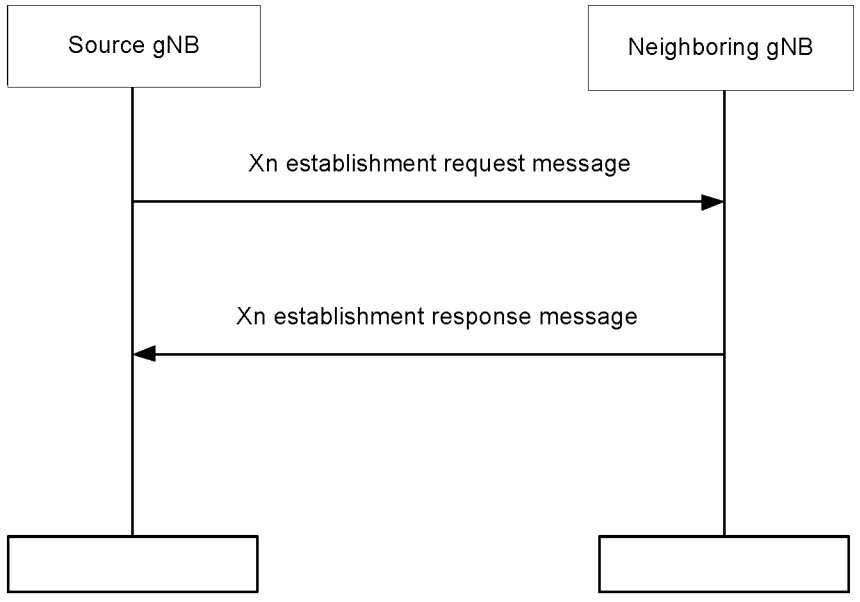
FIG. 6 illustrates an interaction flowchart of MBS session establishment provided by the exemplary embodiments of the disclosure.

FIG. 6 illustrates an interaction flowchart of MBS session establishment provided by the exemplary embodiment of the disclosure. As shown in FIG. 6, the process of establishing an MBS session based on the Xn Setup process in the present example is as follows.

At S1, a source gNB transmits Xn establishment request information to a neighboring gNB. The Xn establishment request information carries an Information Element (IE) for acquiring the MBS service information of a neighboring cell, and is used for requesting the neighboring gNB to respond to the MBS services of each cell and the cell identities to which the MBS services belong (the cell identities are unique in the network, such as an NR Cell Global Identifier (CGI)).

At S2, the neighboring gNB receives the Xn establishment request information from the source gNB, which carries the IE for acquiring the MBS service information of the neighboring cell. The neighboring gNB informs the source gNB of the MBS services in a cell served by the same and the cell identities to which the MBS services belong together through Xn establishment response message.

At S3, the source gNB will inform the UE through a System Information Block (SIB) message or proprietary RRC message after receiving the Xn establishment response message carrying the MBS service information of the neighboring cell and the cell identities to which the MBS services belong.

S4, the UE will trigger the reporting of the MBS interest indication information of the UE after receiving the MBS service information of the neighboring cell and the cell identities to which the MBS services belong transmitted by the source gNB.

Example 2: gNB Configuration Update Process

Figure 7:
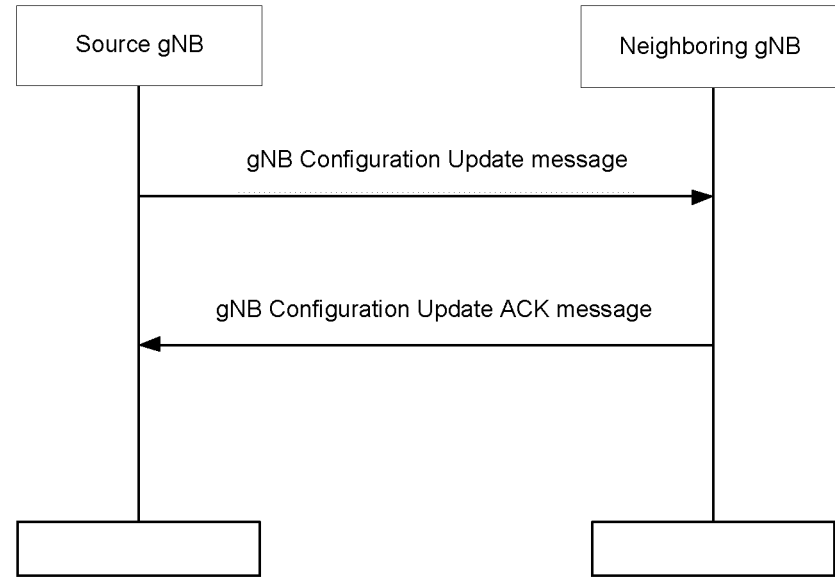
FIG. 7 illustrates an interaction flowchart of MBS session establishment provided by the exemplary embodiments of the disclosure.

FIG. 7 illustrates an interaction flowchart of MBS session establishment provided by the exemplary embodiment of the disclosure. As shown in FIG. 7, the process of establishing an MBS session based on the gNB Configuration Update process in the present example is as follows.

At S1, a Source gNB transmits gNB Configuration Update message to a neighboring gNB. The gNB Configuration Update message carries an IE for acquiring the MBS service information of a neighboring cell, and is used for requesting the neighboring gNB to respond to the MBS services of each cell and the cell identities to which the MBS services belong (the cell identities are unique in the network, such as an NR CGI).

At S2, the neighboring gNB receives the gNB Configuration Update message from the source gNB. The gNB Configuration Update message carries the IE for acquiring the MBS service information of the neighboring cell. The neighboring gNB will inform the source gNB of the MBS services in the cell served by the same and the cell identities to which the MBS services belong together through gNB Configuration Update ACK.

At S3, the source gNB will inform the UE through the SIB message or the proprietary RRC message after receiving the Xn establishment response message carrying the MBS service information of the neighboring cell and the cell identities to which the MBS services belongs.

S4, the UE will trigger the reporting of the MBS interest indication information of the UE after receiving the MBS service information of the neighboring cell and the cell identities to which the MBS services belong transmitted by the source gNB.

Example 3: OAM

In the present example, the MBS services of the neighboring cell and the cells that the MBS services belong may be configured for the source gNB in advance OAM. The source gNB may directly inform the UE through the SIB message or the proprietary RRC message.

Exemplary Embodiment 2

The present embodiment explains a handover process of the UE between the source gNB and the target gNB on the premise of establishing an MBS session between the UE and the source gNB in Exemplary embodiment 1. The abovementioned handover process of the UE between the source gNB and the target gNB is as follows.

First, the UE directly obtains user service information from a service/application layer.

Figures 8, 9:
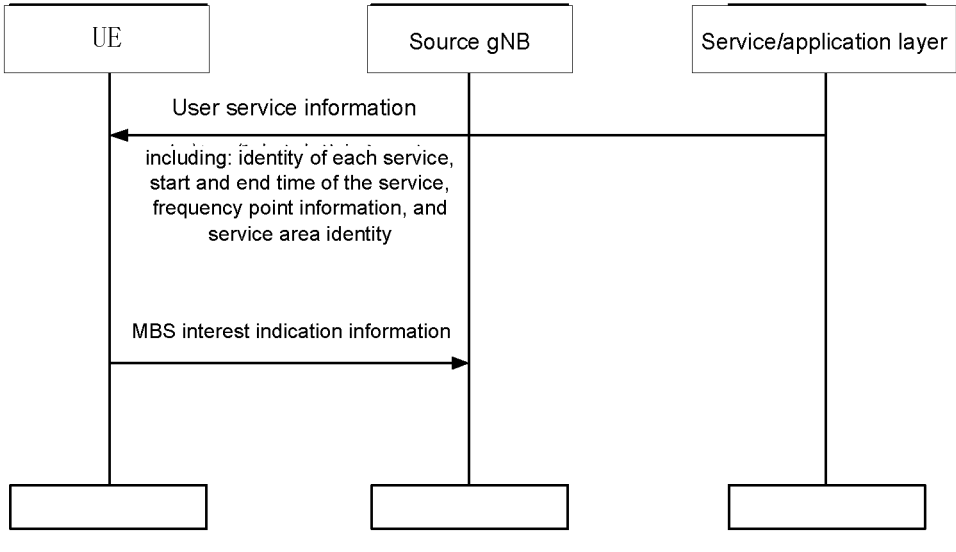
FIG. 8 illustrates an interaction flowchart of UE interest reporting provided by the exemplary embodiments of the disclosure.
FIG. 9 illustrates an interaction flowchart of UE interest reporting provided by the exemplary embodiments of the disclosure.

The abovementioned step is used for the UE to perform interest reporting. FIG. 8 illustrates an interaction flowchart of UE interest reporting provided by the exemplary embodiments of the disclosure. A UE interest reporting process in the abovementioned step is as shown in FIG. 8.

Specifically, the UE obtains the MBS services that the service/application layer can provide, and relevant information of each MBS service, such as frequency point information, MBS service area identity, MBS service identity, start and end time of a service, etc. After receiving the relevant information of the service, the UE will report the MBS services that the UE is interested in receiving and is receiving based on the existing services of the application/service layer and its own interests, so as to assist the source gNB to select the target cell that can support the MBS service that the UE is receiving or is interested in receiving as much as possible.

It is to be noted that the service in the MBS interest indication information message reported by the abovementioned UE is completely based on its own interest.

In the technical solution recorded by the abovementioned steps, the interest reporting of the service by the UE is an autonomous action, and is not limited to whether a neighboring cell has an interested service. When selecting a handover target cell for the UE, a gNB selects a cell that can support the MBS transmission that the UE is receiving or is interested in receiving as much as possible. If a target cell cannot be found to satisfy all MBS services that the UE is receiving or is interested in receiving, then a priority is given to receiving the cell that supports high priority or is receiving the MBS service. Therefore, the abovementioned steps have higher service flexibility. Meanwhile, the updating or change of the relevant information of the application/service layer will inform the UE, and then, the UE will be triggered to report the service that it is interested in.

In the present exemplary example, the UE can not only obtain the MBS services that can be provided, but also the relevant information of MBS services from the application/service layer. FIG. 9 illustrates an interaction flowchart of UE interest reporting provided by the exemplary embodiments of the disclosure. A UE interest reporting process may also be shown in FIG. 9, the UE may also obtain the MBS services provided by the present cell, and the service area to which each service belongs, and the MBS services that can be provided by the neighboring cell and the MBS service area to which each service belongs.

One of the purposes of the abovementioned UE interest reporting is to serve the service continuity. Specifically, for the connected UE, the handover is a network-controlled handover, that is, the UE is handed over to a proper target cell. In order to ensure the MBS service continuity, a serving cell needs to know an MBS service that the UE is receiving or is interested in receiving, so that it is possible to hand over the UE to a cell that it is interested in. Meanwhile, the UE interest reporting may also assist gNB scheduling. When knowing which broadcast multicast services that the UE is interested in through the MBS interest indication information, the target gNB will avoid simultaneously scheduling broadcast multicast transmission and unicast transmission that it is interested in in the same time slot according to the capability of the UE during scheduling.

In order to achieve the abovementioned technical purpose, as shown in FIG. 8 or FIG. 9, in the present exemplary embodiment, the UE needs to transmit the MBS interest indication information to the source gNB. The MBS interest indication information is used for informing the gNB of the MBS that the UE is receiving or is interested in receiving. The MBS interest indication information in the present exemplary embodiment specifically includes the following information:

an MBS service identity list: an MBS service list that the UE is receiving or is interested in receiving. The service identity is used for marking each MBS. The MBS service list is ranked according to the priorities of interest of the MBS services that the UE is receiving or is interested in receiving. That is, the interest of the UE in the MBS ranked first is higher than that in the MBS ranked last in the list.

An MBS receiving priority is used for indicating whether the UE gives a priority to receiving the MBS service relative to unicast. If the received information is "true", then the UE gives a priority to receiving the MBS service in the target cell relative to the unicast service transmission. The information may be used during network congestion. When receiving the information, the target gNB may release a unicast bearer and give a priority to receiving the broadcast multicast transmission.

In an embodiment, the abovementioned MBS interest indication information may further include: a receiving mode (cast mode): which mode is expected to receive corresponding MBS service data by the UE. Specifically, an optional receiving mode: which receiving mode is expected to be adopted for the MBS service that the UE is receiving or is interested in receiving reported in the MBS interest indication information.

It is to be noted that the MBS services that the UE is receiving or is interested in receiving reported by the UE, that is, the MBS identity list in the MBS interest indication information is from: 1) an MBS service that can be provided informed by the application/service layer, and the MBS service and relevant information thereof. It is to be noted that the abovementioned MBS service that can be provided informed by the application/service layer, and the MBS service and relevant information thereof may be provided or not provided on radio, for example, the MBS service reported by the MBS that cannot be provided (which will trigger the UE to request for the establishment of the service from a core network); and 2) the source gNB is informed of the MBS services of the neighboring cell through an Xn interface, and the UE is informed through SIB message or proprietary RRC message. Based on the MBS services in the neighboring cell, the UE will report the MBS services that it is interested or is receiving. The service must be provided on the radio.

The MBS services that the UE is receiving or is interested in receiving reported by the UE are reported in the rank of the priority of interest of the UE in the MBS services. The MBS receiving priority may specifically be used for, when a network is congested, the gNB may decide to release a unicast bearer and give a priority to receiving the data of the broadcast multicast transmission.

Further, for the UE that is receiving the MBS or interested in the MBS, the source gNB may configure the UE to measure an MBS frequency point that the UE is interested in receiving. The UE measures the corresponding frequency point and reports a measurement result. If the source gNB finds that a measurement result reported by the UE includes a frequency point corresponding to a high-priority MBS service, then the source gNB may hand over the UE to a cell where the frequency point corresponding to the high-priority MBS service is located.

When selecting a handover target cell for the UE, a gNB selects a cell that can support the MBS transmission that the UE is receiving or is interested in receiving as much as possible. If a target cell cannot be found to satisfy the MBS service that the UE is receiving or is interested in receiving, then a priority is given to selecting a cell that supports a MBS service which has high priority or is being received.

Further, after the source gNB selects the target cell for the UE, the source gNB may transmit a handover request message to the target cell. In order to realize the continuity of the MBS service, the handover request message may include at least one piece of the following information.

1) The MBS interest indication information of the UE may be used for assisting in flexible scheduling of the source gNB selecting a target cell and a target gNB.

Specifically, the abovementioned MBS interest indication information of the UE may include: 1.1) MBS service list; and 1.2) MBS receiving priority. In an embodiment, the abovementioned handover request message may further include a receiving mode that the UE expects to adopt for the interested service.

The abovementioned MBS interest indication information may assist the source gNB to select the cell supporting the MBS service that the UE is interested in or is receiving as much as possible during selecting the target cell, so as to ensure certain service continuity and flexible scheduling of the target gNB after learning which MBS service the UE is interested in, and avoid scheduling the same MBS service in the same time slot.

2) The MBS service information currently received by the UE may be, for example, MBS session identity information corresponding to the received MBS service, and the MBS session bearer configuration information may be, for example, PTM bearer configuration information and/or PTP bearer configuration information.

Specifically, the abovementioned MBS service information may include: 2.1) MBS session identity information, which indicates that the MBS session identity information of the MBS session corresponding to the MBS service currently received by the UE may include one or more MBS session identities, TMGI of the MBS, the MBS identity, a PDU session identity indicating the MBS session, and an IP multicast address; and 2.2) RB configuration information, which configures the RB of the MBS session, and indicates the MBS session bearer configuration information currently received by the UE. The RB configuration information may specifically include: the PTP bearer configuration information and/or the PTM bearer configuration information. The PTP bearer configuration information specifically includes: a PTP RB identify, SDAP configuration, PDCP configuration, and RLC bearer configuration information. The PTM bearer configuration information specifically includes: PTM RB identify, SDAP configuration, PDCP configuration, and RLC configuration. In an embodiment, for example, a radio resource is configured to, for example, receive the scheduling information of the current MBS service, the scheduling information of a multicast service channel, and the physical layer parameters for receiving the current MBS service.

Through the abovementioned RB configuration information, if the MBS service received in the target cell is the same as the MBS service received in the source cell by the UE, the target gNB may receive the MBS service by adopting the same set of bearer configuration information as the source gNB, that is, the RB configuration, and the scheduling information of the multicast service channel, and the physical layer parameters for receiving the current MBS service. Another solution is that, for the configuration of a bottom layer, if the scheduling information of the multicast service channel and the physical layer parameters for receiving the current MBS service vary in real time, this part of information may not be transmitted to the target gNB by the source gNB, but is configured by the target gNB, and then is informed to the UE.

In an embodiment, the MBS service information may further include: a receiving mode adopted by the MBS session currently received by the UE, which may include the MBS service identity corresponding to the MBS service, and a service area identity.

3) The QoS configuration information of a QoS flow in the MBS session may be, for example, a QoS flow identify list in the session, and QoS parameters corresponding to the QoS flow level of each QoS flow identity.

Specifically, the QoS configuration information indicates each QoS flow in the QoS flow list mapped to the RB corresponding to the MBS service that the UE is receiving currently, which includes one or more QoS flow identities, QoS parameters of the QoS flow level, and the MBS session identity information.

4) The indication information is used for indicating whether to use the PTP bearer configuration information or the PTM bearer configuration when the UE receives the MBS data corresponding to the current MBS service identity.

5) The MBS receiving capability of the UE indicates whether the terminal supports the capability of simultaneously receiving unicast transmission and broadcast multicast transmission in the same time slot. The abovementioned MBS receiving capability of the UE may enable a target network device to consider the terminal capability thereof during scheduling, so as to avoid a conflict between a scheduling result and the terminal capability.

Further, after the target gNB receives the handover request message, a handover request response message may be returned. The target gNB may include at least one piece of the following information in the handover request response message:

1) an acceptable/supportable MBS session resource that the UE is interested in and an unacceptable/unsupportable MBS session resource that the UE is interested in.

Specifically, after receiving the abovementioned handover request message, the target gNB determines which MBS service resources may be accepted, and which MBS service resources may not be accepted. A handover request response message includes an acceptable list of the MBS resources and an unacceptable list of the MBS service resources.

2) Each acceptable MBS resource that the UE is interested in includes an acceptable QoS flow list and an unacceptable QoS flow list, and a PTP/PTM receiving mode indication corresponding to the MBS session, and the PTP/PTM bearer configuration.

Specifically, the target gNB may further give a receiving mode of the corresponding MBS session in the target gNB in the handover request response message, such as PTP and/or PTM reception, and gives RB configuration corresponding to the two modes. In addition, the QoS configuration of the RB of the corresponding receiving mode may also be given.

In an embodiment, the target gNB may further include SIB message of a target cell and MBS control channel and MBS service channel configuration information in the handover response message.

In addition, for the MBS service that the UE is interested or is receiving, the target gNB may have established a corresponding MBS session with a Multi-cell/Multicast Coordination Entity (MCE). For the abovementioned MBS service, the target gNB only needs to configure a PTP mode and/or a PTM mode for the UE to receive the MBS. For the target gNb that can support the MBS, the MBS service has not established an MBS session with the MCE/AMF, the target gNB may initiate an MBS session establishment request to the MCE/AMF.

In an embodiment, for each unacceptable MBS session resource that the UE is interested in, the handover request response message may further include an MBS session identity and a reason for not accepting the MBS session resource.

In an embodiment, the handover request response message may further include the SIB message of the target cell and the MBS control channel and MBS channel configuration information.

Further, when/after the target gNB returns the handover request response message to the source gNB, a handover command message may also be transmitted. The handover command message includes an RRC reconfiguration message. The RRC reconfiguration message specifically includes: a receiving mode for receiving a corresponding MBS session, and a Radio Bearer (RB) configuration (Data Radio Bearer/Multicast Radio Bearer (DRB/MRB)) corresponding to the receiving mode.

Specifically, for the PTM receiving mode, the target gNB also needs to indicate that which MBS service resources need to be transmitted in the PTM mode and the corresponding MRB configuration in the handover response/command message. For the modes of the PTP reception and PTM reception, the target gNB also needs to indicate to accept the MBS service resource in the PTM mode and the PTP mode, and simultaneously, gives a corresponding configuration in the RRC reconfiguration message.

In an embodiment, the abovementioned handover command message further includes a QoS profile indication of a supportable MBS service.

Further, after receiving the handover command message transmitted by the abovementioned target gNB, an acknowledgement message may also be returned to the target gNB, so as to confirm that the reconfiguration of the RRC connection is completed.

A handover process of the abovementioned UE between the source gNB and the target gNB is specifically explained through an example.

Example 4

Figure 10:
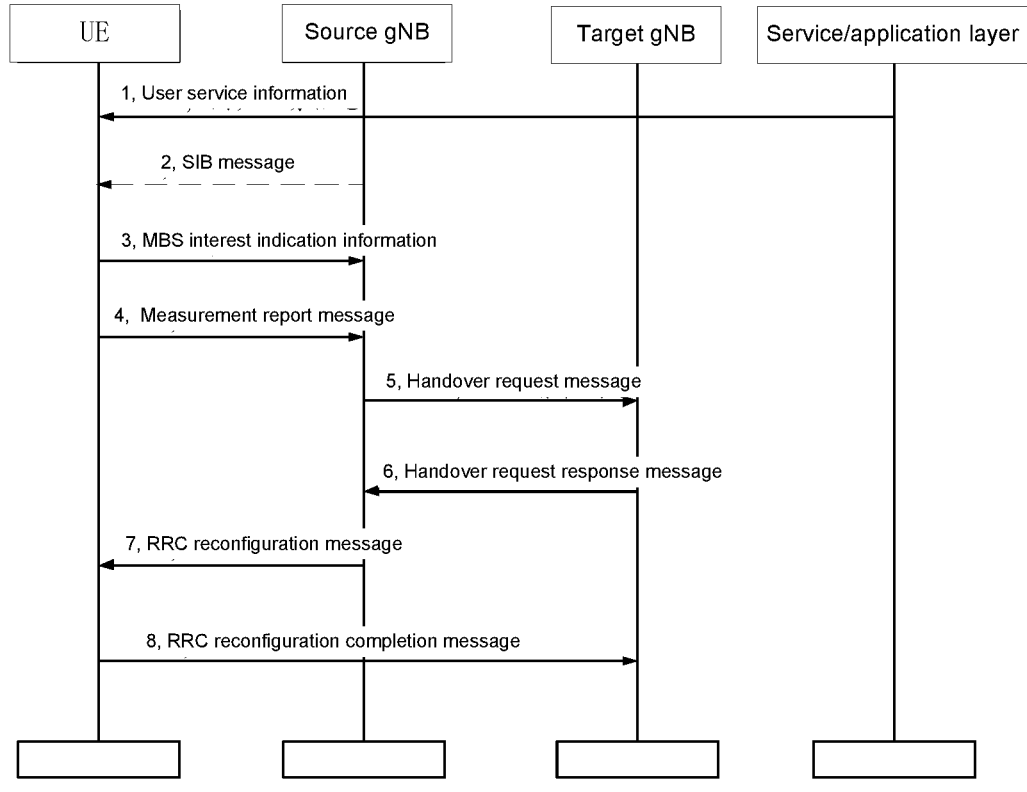
FIG. 10 illustrates an interaction flowchart of a handover method provided by the exemplary embodiments of the disclosure.

FIG. 10 illustrates an interaction flowchart of a handover method provided by the exemplary embodiments of the disclosure. In the example, the process of realizing the handover of the UE between the source gNB and the target gNB is as shown in FIG. 10. A specific process of the abovementioned handover is as follows.

At S1, the UE obtains MBS services that can be provided and relevant information of each MBS from a service/application layer, which specifically includes: the MBS service identity (such as a TMGI and an MBS service ID), the information of a frequency point where the MBS service is located, and an MBS service area where the MBS service is located, and the start and end time of the MBS service. In addition, the UE will read a system message, so as to learn the MBS services in the current cell and a neighboring cell, and an MBS service area to which each service belongs.

S2, the UE receives the relevant information of the service/application layer about the MBS service, and the MBS services that can be provided by the neighboring cell. Based on the information, the UE reports the MBS service that it is receiving or is interested in receiving to the source gNB through an MBS interest indication information message. The MBS services reported by the UE are reported after ranking the priorities of interest of the UE in the services. In addition, in order to serve the service continuity of the MBS and support the flexible scheduling, the MBS interest indication information message may further include any combination of the following information: an MBS service list that the UE is interested in or is receiving, and the priority of the MBS transmission relative to unicast reception. In an embodiment, the MBS interest indication information message further includes the receiving mode of the currently received MBS service and UE capability.

S3, the UE will measure a frequency point that the UE is interested in receiving configured to the UE by a network, and report a measurement result to the source gNB through a measurement report message. The gNB will select a cell that support the MBS that the UE is receiving or is interested in receiving as much as possible.

S4, the source gNB transmits a handover request message to the target gNB through an Xn interface, and its purpose is to hand over a request resource, and informs UE context on a source gNB side to the target gNB. The handover request message may specifically include at least one piece of the following information: interest indication information reported by the UE, the MBS service information currently received by the UE (such as the MBS session identity information corresponding to the received MBS service), the MBS session bearer configuration information (such as the PTM bearer configuration information and/or the PTP bearer configuration information), the QoS configuration information of a QoS flow in the MBS session (such as a QoS flow identity list in the session, and QoS parameters corresponding to the QoS flow level of each QoS flow identity), the indication information indicating whether to use the PTP bearer configuration information or the PTM bearer configuration when the UE receives the MBS data corresponding to the current MBS service identity, and the MBS receiving capability information of the UE.

S5, after receiving the handover request message, the target gNB will perform acceptance control to determine which MBS session resources may be accepted, and which MBS session resources may not be accepted, and return a handover request response message to the source gNB. The acceptable MBS session may further include an acceptable QoS flow list and an unacceptable QoS flow list, and a PTP/PTM receiving mode indication corresponding to the MBS session, and the PTP/PTM bearer configuration.

The unacceptable MBS session resource may include the MBS session identity and a reason for not accepting MBS session resource.

In an embodiment, the handover response message may further include SIB message of the target cell, and MBS control channel and MBS service channel configuration information.

S6, the target gNB may include RRC reconfiguration message in a handover command to be transmitted to the UE, which mainly includes: a receiving mode in which the MBS service is received, and an RB configuration of the corresponding receiving mode.

S7, the UE will respond an RRC reconfiguration completion message to the target gNB, which is used for determining that one RRC connection configuration has be connected successfully. In this way, a corresponding broadcast multicast service may be received by the target gNB in a PTP and/or PTM receiving mode.

Through the description of the above implementations, those of ordinary skill in the art can clearly understand that the method according to the abovementioned embodiment may be implemented by means of software plus a necessary general hardware platform, and of course, may also be implemented through hardware. Based on such understanding, the technical solution of the disclosure may be embodied in the form of a software product. The computer software product is stored in a storage medium (such as a ROM/RAM, a magnetic disk, and a compact disk), including a plurality of instructions for enabling a terminal device (which may be a mobile phone, a computer, a server, or a network device, etc.) to perform the methods described in various embodiments of the disclosure.

Embodiment 4

The embodiment of the disclosure provides a handover apparatus, which is applied to a first network device. The apparatus is configured to implement the abovementioned embodiments and optional implementation modes, and those have been described will not be elaborated. As used below, the term "module" may implement a combination of software and/or hardware of a predetermined function. Although the apparatus described in the following embodiments is implemented in software, hardware, or a combination of software and hardware, is also possible and contemplated.

Figure 11:
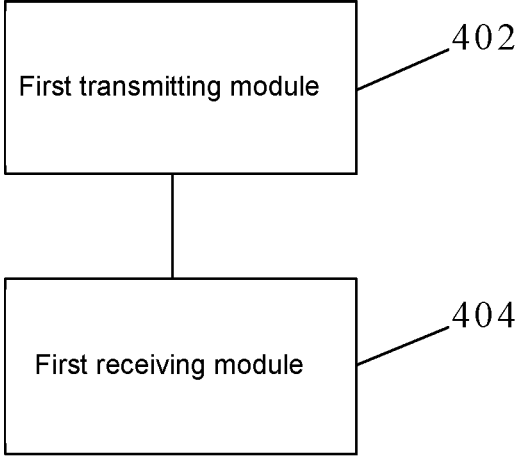
FIG. 11 illustrates a block structural diagram of a handover apparatus provided by the embodiments of the disclosure.

FIG. 11 illustrates a structural block diagram of a handover apparatus provided according to the embodiments of the disclosure. As shown in FIG. 11, the handover apparatus in the present embodiment includes: a first transmitting module 402 and a first receiving module 404.

The first transmitting module 402 is configured to transmit a handover request to a second network device. The handover request carries MBS session/bearer information.

The first receiving module 404 is configured to receive a handover request response transmitted by the second network device. The handover request response includes at least one of the following:

MBS session/bearer information that can be accepted by the second network device, MBS session/bearer information that cannot be accepted by the second network device, UE scheduling configuration information of the second network device, or bearer configuration information of the second network device.

It is to be further noted that the rest optional embodiments and technical effects of the handover apparatus in the present embodiment all correspond to the handover method recorded in Embodiment 1, and will not be elaborated herein.

In an embodiment, the MBS session/bearer information includes at least one of the following: the MBS session information that a terminal is interested in, the MBS session/bearer information currently received by the terminal, or terminal capability information.

In an embodiment, the MBS session information that the terminal is interested in includes at least one of the following: identity information of an MBS session that the terminal is interested in, an MBS area identity, receiving priority information, MBS session receiving mode information that the terminal expects.

In an embodiment, the receiving priority information includes at least one of the following: priority of unicast reception, priority of broadcast/multicast reception, or the priority of receiving an MBS session.

In an embodiment, the MBS session/bearer information currently received by the terminal includes at least one of the following: identity information of the MBS session/bearer currently received by the terminal, receiving mode information of the MBS session/bearer currently received by the terminal, RB configuration information of an MBS bearer currently received by the terminal, or QoS configuration information of the MBS session/bearer currently received by the terminal.

In an embodiment, the MBS session receiving mode information that the terminal expects includes at least one of the following: PTP reception, PTM reception, or PTP and PTM simultaneous reception. The receiving mode information of the MBS session/bearer currently received by the terminal includes at least one of the following: PTP reception, PTM reception, or PTP and PTM simultaneous reception.

In an embodiment, the terminal capability information is used for indicating that: the terminal supports receiving a unicast service and the MBS session in the same time slot; or, the terminal does not support receiving the unicast service and the MBS session in the same time slot.

In an embodiment, the RB configuration information includes: PTP bearer configuration information, and/or, PTM bearer configuration information.

The PTP bearer configuration information is used for configuring a PTP bearer, and the PTP bearer includes at least one of the following:

a PTP RB identify, SDAP configuration information, PDCP configuration information, or RLC bearer configuration information.

The PTM bearer configuration information is used for configuring a PTM bearer, and the PTM bearer configuration information includes at least one of the following:

a PTM RB identify, a logical channel identify, SDAP configuration information, PDCP configuration information, or RLC bearer configuration information.

In an embodiment, the identity information of the MBS session that the terminal is interested in includes at least one of the following: an MBS session identity, a TMGI of the MBS session, or a PDU session identity indicating a broadcast/multicast session.

In an embodiment, the MBS session/bearer information that can be accepted indicated in the handover request response includes at least one of the following: an MBS session/bearer identity that can be accepted by the second network device, a receiving mode of the broadcast/unicast service session, and Quality of Service (QoS) configuration information of the service session/bearer that can be accepted.

In an embodiment, the MBS session/bearer information that cannot be accepted indicated in the handover request response includes at least one of the following: an MBS session/bearer identity that cannot be accepted by the second network device, or a reason that the second network device cannot accept the MBS session/bearer corresponding to the MBS session/bearer identity.

In an embodiment, the bearer configuration information of the second network device includes at least one of the following: a PTM RB identify, a logical channel identify, SDAP configuration information, PDCP configuration information, or RLC bearer configuration information.

In an embodiment, the UE scheduling configuration information of the second network device indicated in the handover request response includes at least one of the following: scheduling information of a multicast service channel, or physical layer parameters required for configuring the multicast service channel.

In an embodiment, the handover request response further includes at least one of the following: system information block configuration information of the second network device, multicast control channel configuration information, or multicast service channel configuration information.

In an embodiment, the operation that the handover request is transmitted to the second network device includes the following operations: the handover request is transmitted to the AMF, and the handover request is forwarded to the second network device through the AMF. The handover request received by the second network device carries MBS session bearer information.

In an embodiment, before transmitting the handover request to the second network device, the method further includes the following operation: a measurement result of a broadcast/multicast service frequency point transmitted by a terminal is received.

It is to be noted that each of the above modules may be implemented by software or hardware. For the latter, it may be implemented by, but not limited to, the following manners that the above modules are all located in the same processor; or, the above modules are located in different processors in any combination form respectively.

Embodiment 5

The embodiment of the disclosure provides an information transmitting apparatus, which is applied to a terminal. The apparatus is configured to implement the abovementioned embodiments and optional implementation modes, and those have been described will not be elaborated. As used below, the term "module" may implement a combination of software and/or hardware of a predetermined function. Although the apparatus described in the following embodiments is implemented in software, hardware, or a combination of software and hardware, is also possible and contemplated.

Figure 12:
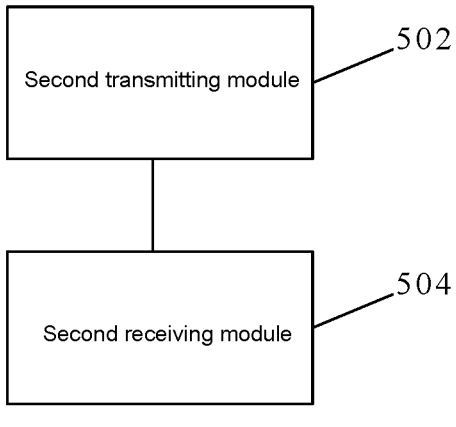
FIG. 12 illustrates a block structural diagram of an information transmitting apparatus provided by the embodiments of the disclosure.

FIG. 12 illustrates a structural block diagram of an information transmitting apparatus provided by the embodiments of the disclosure. As shown in FIG. 12, information transmitting apparatus in the present embodiment includes: a second transmitting module 502 and a second receiving module 504.

The second transmitting module 502 is configured to transmit MBS indication information that the UE is interested in and the MBS indication information being received by the UE to a first network device.

The second receiving module 504 is configured to receive RRC reconfiguration information returned by the first network device according to MBS indication information that the UE is interested in.

It is to be further noted that the rest optional embodiments and technical effects of the information transmitting apparatus in the present embodiment all correspond to the information transmitting method recorded in Embodiment 2, and will not be elaborated herein.

In an embodiment, the MBS indication information that the UE is interested in further includes: service identity information of an MBS that the UE is interested in. The service identity information of the MBS further includes at least one of the following: an MBS service/session identity, a TMGI of the MBS, an MBS identity, or a (PDU) session identity indicating an MBS session.

In an embodiment, the MBS indication information that the UE is interested in further includes: a receiving mode of the MBS that the UE is interested in. The receiving mode includes at least one of the following: unicast reception, multicast/broadcast reception, or unicast and multicast simultaneous reception.

In an embodiment, the MBS indication information that the UE is interested in further includes: a service area to which the MBS that the UE is interested in belongs.

In an embodiment, the RRC reconfiguration information includes: a target cell identity, an acceptable MBS list, acceptable MBS configuration information, and acceptable MBS receiving mode information.

In an embodiment, the acceptable MBS configuration information includes at least one of the following: a PTM RB identify, a logical channel identify, SDAP configuration information, PDCP configuration information, or RLC bearer configuration information.

In an embodiment, the acceptable MBS configuration information includes at least one of the following: scheduling information of a multicast service channel, or physical layer parameters required for configuring the multicast service channel.

In an embodiment, the acceptable MBS receiving mode information includes at least one of the following: unicast reception, multicast/broadcast reception, or unicast and multicast simultaneous reception.

In an embodiment, after receiving the RRC reconfiguration information returned by the first network device according to the MBS indication information, the method further includes the following operation: releasing a resource of the first network device, reconstructing the PDCP and the RLC according to the RB configuration information from the second network device, and resetting a Media Access Control (MAC), so as to establish a PTM bearer, and receive a service based on the PTM bearer.

It is to be noted that each of the above modules may be implemented by software or hardware. For the latter, it may be implemented by, but not limited to, the following manners that the above modules are all located in the same processor; or, the above modules are located in different processors in any combination form respectively.

Embodiment 6

The embodiment of the disclosure provides a handover apparatus, which is applied to a second network device. The apparatus is configured to implement the abovementioned embodiments and optional implementation modes, and those have been described will not be elaborated. As used below, the term "module" may implement a combination of software and/or hardware of a predetermined function. Although the apparatus described in the following embodiments is implemented in software, hardware, or a combination of software and hardware, is also possible and contemplated.

Figure 13:
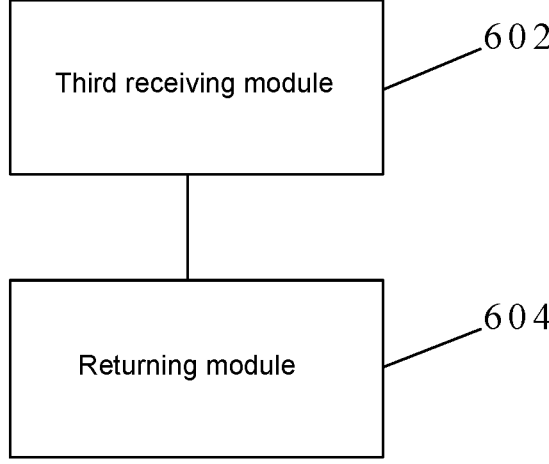
FIG. 13 illustrates a block structural diagram of a handover apparatus provided by the embodiments of the disclosure.

FIG. 13 illustrates a structural block diagram of a handover apparatus provided according to the embodiments of the disclosure. As shown in FIG. 13, the handover apparatus in the present embodiment includes: a third receiving module 602 and a returning module 604.

The third returning module 602 is configured to receive a handover request transmitted by a first network device. The handover request carries MBS session/bearer information, the MBS session information is used for indicating an MBS session, and the MBS bearer information is used for indicating an MBS bearer.

The returning module 604 is configured to return a handover response to the first network device according to the handover request. The handover response is used for indicating at least one of the following: MBS session/bearer information that can be accepted by the second network device, MBS session/bearer information that cannot be accepted by the second network device, UE scheduling configuration information of the second network device, or bearer configuration information of the second network device.

It is to be further noted that the rest optional embodiments and technical effects of the handover apparatus in the present embodiment all correspond to the handover method in Embodiment 3, and will not be elaborated herein.

In an embodiment, the MBS session/bearer information includes at least one of the following: the MBS session information that a terminal is interested in, the MBS session/bearer information currently received by the terminal, or terminal capability information.

In an embodiment, the MBS session information that the terminal is interested in includes at least one of the following: identity information of an MBS session that the terminal is interested in, an MBS area identity, receiving priority information, MBS session receiving mode information that the terminal expects.

In an embodiment, the receiving priority information includes at least one of the following: priority of unicast reception, priority of broadcast/multicast reception, or the priority of receiving an MBS session.

In an embodiment, the MBS session/bearer information currently received by the terminal includes at least one of the following: identity information of the MBS session/bearer currently received by the terminal, receiving mode information of the MBS session/bearer currently received by the terminal, RB configuration information of an MBS bearer currently received by the terminal, or QoS configuration information of the MBS session/bearer currently received by the terminal.

In an embodiment, the MBS session receiving mode information that the terminal expects includes at least one of the following: PTP reception, PTM reception, or PTP and PTM simultaneous reception. The receiving mode information of the MBS session/bearer currently received by the terminal includes at least one of the following: PTP reception, PTM reception, or PTP and PTM simultaneous reception.

In an embodiment, the terminal capability information is used for indicating that: the terminal supports receiving a unicast service and the MBS session in the same time slot; or, the terminal does not support receiving the unicast service and the MBS session in the same time slot.

In an embodiment, the RB configuration information includes: PTP bearer configuration information, and/or, PTM bearer configuration information.

The PTP bearer configuration information is used for configuring a PTP bearer, and the PTP bearer includes at least one of the following: a PTP RB identify, SDAP configuration information, PDCP configuration information, or RLC bearer configuration information.

The PTM bearer configuration information is used for configuring a PTM bearer, and the PTM bearer configuration information includes at least one of the following: a PTM RB identify, a logical channel identify, SDAP configuration information, PDCP configuration information, or RLC bearer configuration information.

In an embodiment, the identity information of the MBS session that the terminal is interested in includes at least one of the following: an MBS session identity, a TMGI of the MBS session, or a PDU session identity indicating a broadcast/multicast session.

In an embodiment, the MBS session/bearer information that can be accepted indicated in the handover request response includes at least one of the following: an MBS session/bearer identity that can be accepted by the second network device, a receiving mode of the broadcast/unicast service session, and Quality of Service (QoS) configuration information of the service session/bearer that can be accepted.

In an embodiment, the MBS session/bearer information that cannot be accepted indicated in the handover request response includes at least one of the following: an MBS session/bearer identity that cannot be accepted by the second network device, or a reason that the second network device cannot accept the MBS session/bearer corresponding to the MBS session/bearer identity.

In an embodiment, the bearer configuration information of the second network device includes at least one of the following: a PTM RB identify, a logical channel identify, SDAP configuration information, PDCP configuration information, or RLC bearer configuration information.

In an embodiment, the UE scheduling configuration information of the second network device indicated in the handover request response includes at least one of the following: scheduling information of a multicast service channel, or physical layer parameters required for configuring the multicast service channel.

In an embodiment, the handover request response further includes at least one of the following: system information block configuration information of the second network device, multicast control channel configuration information, or multicast service channel configuration information.

In an embodiment, the operation that the handover request is transmitted to the second network device includes the following operations: the handover request is transmitted to the AMF, and the handover request is forwarded to the second network device through the AMF. The handover request received by the second network device carries MBS session bearer information.

In an embodiment, before transmitting the handover request to the second network device, the method further includes the following operation: a measurement result of a broadcast/multicast service frequency point transmitted by a terminal is received.

It is to be noted that each of the above modules may be implemented by software or hardware. For the latter, it may be implemented by, but not limited to, the following manners that the above modules are all located in the same processor; or, the above modules are located in different processors in any combination form respectively.

Embodiment 7

The embodiments of the present disclosure further provide a computer-readable storage medium. The computer-readable storage medium stores a computer program. The computer program is configured to perform the steps in any one of the abovementioned embodiments when being run.

In an embodiment, in the present embodiment, the abovementioned computer-readable storage medium may be configured to store a computer program for performing the abovementioned embodiments.

In an embodiment, in the present embodiment, the abovementioned computer-readable storage medium may include, but is not limited to, various media capable of storing a computer program, such as a USB flash disk, a Read-Only Memory (ROM), a Random Access Memory (RAM), a mobile hard disk, a magnetic disk or a compact disk.

Embodiment 8

The embodiments of the disclosure further provide an electronic apparatus, including a memory and a processor. The memory stores a computer program, and the processor is configured to run the computer program to perform the steps in any one of the abovementioned method embodiments.

In an embodiment, the abovementioned electronic apparatus may further include an transmission device and an input/output device. The transmission device is connected to the abovementioned processor. The input/output device is connected to the abovementioned processor.

In an embodiment, in the present embodiment, the abovementioned processor may be configured to perform the steps in the abovementioned embodiments through a computer program.

In an embodiment, a specific example in the present embodiment may refer to the examples described in the above embodiments and alternative implementation manners, which is not elaborated herein in the present embodiment.

Those skilled in the art shall understand that the abovementioned various modules or steps in the present disclosure may be implemented by using a general calculation apparatus, may be centralized on a single calculation apparatus or may be distributed on a network composed of a plurality of calculation apparatuses. In an embodiment, they may be implemented by using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit module respectively, or multiple modules or steps therein are manufactured into a single integrated circuit module. Therefore, the disclosure is not limited to any specific combination of hardware and software.

What is claimed is:

1. A handover method, applied to a first network device, comprising:

transmitting a handover request to a second network device, wherein the handover request carries Multicast Broadcast Service (MBS) session/bearer information; wherein the MBS session/bearer information comprises Quality of Service (QOS) configuration information of the MBS session/bearer currently received by a terminal, wherein the QoS configuration information is used to indicate each QoS flow in a QoS flow list mapped to a Radio Bearer (RB) corresponding to a MBS service that the terminal is receiving currently, which includes one or more QoS flow identities, QoS parameters of Qos flow level, and MBS session identity information; and receiving a handover request response transmitted by the second network device, wherein the handover request response comprises at least one of the following:

MBS session/bearer information that can be accepted by the second network device, MBS session/bearer information that cannot be accepted by the second network device, terminal UE (User Equipment) scheduling configuration information of the second network device, or bearer configuration information of the second network device;

wherein the QoS configuration information is provided to the second network device in the handover request to enable the second network device to determine, for the terminal upon handover, whether to configure a bearer for the MBS session that is consistent with a bearer configuration used by the first network device, wherein the MBS session/bearer information comprises at least one of the following:

the MBS session/bearer information that a terminal is interested in, the MBS session/bearer information currently received by the terminal, or terminal capability information, and wherein the terminal capability information is used for indicating that: the terminal supports receiving a unicast service and an MBS session in the same time slot; or, the terminal does not support receiving the unicast service and the MBS session in the same time slot.

2. The method according to claim 1, wherein the MBS session information that the terminal is interested in comprises at least one of the following:

identity information of an MBS session that the terminal is interested in, an MBS area identity, receiving priority information, or the MBS session receiving mode information that the terminal expects.

3. The method according to claim 2, wherein the receiving priority information comprises at least one of the following: priority of unicast reception, priority of broadcast/multicast reception, or priority of receiving the MBS session.

4. The method according to claim 2, wherein the identity information of the MBS session that the terminal is interested in comprises at least one of the following: an MBS session identity, a Temporary Mobile Group Identity (TMGI) of the MBS session, or a Protocol Data Unit (PDU) session identity indicating a broadcast/multicast session.

5. The method according to claim 1, wherein the MBS session/bearer information currently received by the terminal comprises at least one of the following:

identity information of the MBS session/bearer currently received by the terminal, receiving mode information of the MBS session/bearer currently received by the terminal, Radio Bearer (RB) configuration information of an MBS bearer currently received by the terminal.

6. The method according to claim 5, wherein the MBS session/bearer receiving mode information that the terminal expects comprises at least one of the following: Point to Point (PTP) reception, Point to Multipoint (PTM) reception, or PTP and PTM simultaneous reception; the receiving mode information of the MBS session/bearer currently received by the terminal comprises at least one of the following: PTP reception, PTM reception, or PTP and PTM simultaneous reception.

7. The method according to claim 5, wherein the RB configuration information comprises at least one of the following: PTP bearer configuration information or PTM bearer configuration information, wherein the PTP bearer configuration information is used for configuring a PTP bearer, and the PTP bearer configuration information comprises at least one of the following:

a PTP RB identify, Service Data Adaptation Protocol (SDAP) configuration information, Packet Data Aggregation Protocol (PDCP) configuration information, or Radio Link Control (RLC) bearer configuration information;

the PTM bearer configuration information is used for configuring a PTM bearer, and the PTM bearer configuration information comprises at least one of the following:

a PTM RB identify, a logical channel identify, the SDAP configuration information, the PDCP configuration information, or the RLC bearer configuration information.

8. The method according to claim 1, wherein the MBS session/bearer information that can be accepted indicated in the handover request response comprises at least one of the following:

an MBS session/bearer identity that can be accepted by the second network device, a receiving mode of the broadcast/unicast service session, or Quality of Service (QOS) configuration information of the service session/bearer that can be accepted;

or, wherein the MBS session/bearer information that cannot be accepted indicated in the handover request response comprises at least one of the following:

an MBS session/bearer identity that cannot be accepted by the second network device, or a reason that the second network device cannot accept the MBS session/bearer corresponding to the MBS session/bearer identity;

or, wherein the bearer configuration information of the second network device comprises at least one of the following:

a Point to Multipoint (PTM) radio bearer identify, a logical channel identify, Service Data Adaptation Protocol (SDAP) configuration information, Packet Data Aggregation Protocol (PDCP) configuration information, or Radio Link Control (RLC) bearer configuration information;

or, wherein the UE scheduling configuration information of the second network device indicated in the handover request response comprises at least one of the following:

scheduling information of a multicast service channel, or physical layer parameters required for configuring the multicast service channel;

or, wherein the handover request response further comprises at least one of the following: System Information Block (SIB) configuration information of the second network device, multicast control channel configuration information, or multicast service channel configuration information;

or, wherein the transmitting a handover request to the second network device comprises:

transmitting the handover request to an Access and Mobility Management Function (AMF), and forwarding the handover request to the second network device through the AMF, wherein the handover request received by the second network device carries the MBS session/bearer information;

or, wherein the MBS session information is further used for indicating: MBS services corresponding to MBS sessions, wherein the MBS sessions and the MBS services are in one-to-one correspondence.

9. A handover method, applied to a second network device, comprising:

receiving a handover request transmitted by a first network device, wherein the handover request carries Multicast Broadcast Service (MBS) session/bearer information, the MBS session information is used for indicating an MBS session, and the MBS bearer information is used for indicating an MBS bearer, wherein the MBS session/bearer information comprises Quality of Service (Qos) configuration information of the MBS session/bearer currently received by a terminal, wherein the Qos configuration information is used to indicate each QoS flow in a QoS flow list mapped to a Radio Bearer (RB) corresponding to a MBS service that the terminal is receiving currently, which includes one or more QoS flow identities, QoS parameters of QoS flow level, and MBS session identity information; and determining, using the QoS configuration information, whether to configure a bearer for the MBS session for the terminal that is consistent with a bearer configuration used by the first network device;

returning a handover response to the first network device according to the handover request, wherein the handover response is used for indicating at least one of the following: MBS session/bearer information that can be accepted by the second network device, MBS session/bearer information that cannot be accepted by the second network device, terminal UE (User Equipment) scheduling configuration information of the second network device, or bearer configuration information of the second network device, wherein the MBS session/bearer information comprises at least one of the following:

the MBS session/bearer information that a terminal is interested in, the MBS session/bearer information currently received by the terminal, or terminal capability information, and wherein the terminal capability information is used for indicating that: the terminal supports receiving a unicast service and an MBS session in the same time slot; or, the terminal does not support receiving the unicast service and the MBS session in the same time slot.

10. The method according to claim 9, wherein the MBS session/bearer information comprises at least one of the following:

the MBS session/bearer information that a terminal is interested in, the MBS session/bearer information currently received by the terminal, or terminal capability information.

11. The method according to claim 10, wherein the MBS session/bearer information that the terminal is interested in comprises at least one of the following:

identity information of the MBS session that the terminal is interested in, an MBS area identity, receiving priority information, or the MBS session/bearer receiving mode information that the terminal expects.

12. The method according to claim 11, wherein the receiving priority information comprises at least one of the following:

priority of unicast reception, priority of broadcast/multicast reception, or the priority of receiving an MBS session;

or, wherein the MBS session/bearer information currently received by the terminal comprises at least one of the following:

identity information of the MBS session/bearer currently received by the terminal, receiving mode information of the MBS session/bearer currently received by the terminal, Radio Bearer (RB) configuration information of an MBS bearer currently received by the terminal.

13. A non-transitory computer-readable storage medium, storing a computer program, wherein the computer program is configured to implement the method of any one of claims 1-8 and 9-12.

14. An electronic apparatus, comprising a memory and a processor, wherein the memory stores a computer program, and the processor is configured to run the computer program to implement the method of any one of claims 1-8 and 9-12.

* * * * *